(12) United States Patent
Miller et al.

(10) Patent No.: US 8,031,858 B2
(45) Date of Patent: Oct. 4, 2011

(54) CALL FLOW FRAMEWORK FOR CONSISTENT TROUBLESHOOTING ACROSS MULTIPLE VENDORS AND LOCATIONS

(75) Inventors: Michael J. Miller, Aurora, CO (US); Matthew D. Goodman, Greenwood Village, CO (US); Shawn D. Meyer, Shakopee, MN (US)

(73) Assignee: Accenture Global Services Limited, Dublin (IE)

( * ) Notice: Subject to any disclaimer, the term of this patent is extended or adjusted under 35 U.S.C. 154(b) by 941 days.

(21) Appl. No.: 11/950,160

(22) Filed: Dec. 4, 2007

(65) Prior Publication Data

US 2009/0141868 A1  Jun. 4, 2009

(51) Int. Cl.
  *H04M 3/523* (2006.01)
  *H04M 3/08* (2006.01)
  *H04M 3/22* (2006.01)
  *H04M 3/42* (2006.01)

(52) U.S. Cl. ............. 379/265.01; 379/10.01; 379/10.02; 379/10.03; 379/11; 379/16; 379/201.01; 379/265.02; 379/265.07; 379/265.08; 379/266.1

(58) Field of Classification Search ................ 379/1.01, 379/9, 14, 10.01–10.03, 11, 15.01, 16, 265.01–265.14, 379/266.01–266.1, 201.01
See application file for complete search history.

(56) References Cited

U.S. PATENT DOCUMENTS

| | | | |
|---|---|---|---|
| 7,039,166 B1* | 5/2006 | Peterson et al. | 379/88.18 |
| 7,783,030 B1* | 8/2010 | Bruening et al. | 379/266.07 |
| 7,881,440 B2* | 2/2011 | Castillo et al. | 379/29.1 |
| 2005/0190897 A1* | 9/2005 | Eberle et al. | 379/88.17 |
| 2007/0147600 A1* | 6/2007 | Stahlman et al. | 379/266.07 |
| 2007/0160191 A1* | 7/2007 | Blair | 379/265.04 |
| 2007/0217576 A1* | 9/2007 | Blair | 379/1.01 |
| 2008/0144786 A1* | 6/2008 | Wang et al. | 379/88.18 |
| 2009/0080639 A1* | 3/2009 | Daye et al. | 379/265.01 |

FOREIGN PATENT DOCUMENTS

WO  WO 96/05685  2/1996

* cited by examiner

*Primary Examiner* — Harry Hong
(74) *Attorney, Agent, or Firm* — Brinks Hofer Gilson & Lione

(57) ABSTRACT

A call flow guidance system helps a call center agent navigate the maze of complex call flows that apply to an enormous spectrum of caller issues, and further improves adoption rates and training timelines for the call center agents. Through the system, call center agents easily navigate multiple call flows and view information tailored to improve average handle time (AHT) and first call resolution (FCR). The system provides dynamic content attached to call flows and improve call flow navigation by implementing links that bridge nodes between display sections of a particular call flow and links that cross from one call flow to another.

20 Claims, 14 Drawing Sheets

CALL FLOW FRAMEWORK FOR CONSISTENT TROUBLESHOOTING ACROSS MULTIPLE VENDORS AND LOCATIONS

BACKGROUND OF THE INVENTION

1. Technical Field

This disclosure concerns a system and method for improving call center support services by providing a dynamic call flow tool to call center agents. In particular, this disclosure relates to an efficient and cost effective way to improve call handling, learning adoption rates, and training timelines for call center agents.

2. Background Information

The growth and globalization of the call center support industry has resulted from the globalization of markets that rely on call center support services. In many cases, the global markets rely on 24×7 call center support in order to handle the enormous volume of customer calls, each of which must be handled in an efficient, correct, and helpful manner. Call center support organizations deliver support services under the constant pressure of lowering operating margins in order to remain competitive and locate call center facilities in economically viable and geographically diverse regions of the world. Vendors in the global market place constantly introduce new technologies and products, which force call center organizations to constantly distribute information on new technologies and products, including new call flows and revised call flows for handling customer inquiries. Accordingly, call centers maintain agent training programs in order to attempt to address new and continually changing call flows, slow learning adoption rates, and long training timelines for call agents.

Call centers measure the performance of call center facilities and individual agents based on many factors, including average handle time (AHT) and first call resolution (FCR). Call centers measure and define AHT as the sum of the average talk time between a consumer and agent and the average after-call work required to resolve the issue that the consumer called for support. Call centers measure first call resolution as an indication of whether an issue is resolved for a caller upon the first call, avoiding a need for a subsequent call. Improved AHT and FCR are goals for most call centers. Yet, significant technical challenges exist to improving AHT, FCR and their related performance parameters.

Many call centers use paper based call flows in an attempt to improve AHT and FCR. However, call center managers must physically distribute to agents located across various geographical locations paper based call flows that are not easy to read, require agents to manually flip through multiple call flows, and determine to which of multiple pages in a complex call flow to turn at any given point. The result is slow learning adoption rates, long training timelines for call agents, and reduced ability to successfully resolve the call.

Therefore, a need exists for a system and method that address the problems noted above and other problems previously encountered.

SUMMARY

A call flow guidance system (CFGS) provides dynamic call flows to call center agents and a framework for consistent troubleshooting across multiple vendors and locations. The CFGS provides multiple flow options, informational links, and navigation paths through call flows that call center agents use to provide support services. The CFGS provides a navigation capability to agents so that the agents can navigate an entire call flow without scrolling through the call flow and the agent can quickly navigate to and between different call flows. In one implementation, the CFGS manages navigation between and within call flows without using the page referencing functionality of a browser, so that navigation between and within call flows is independent of the browser navigation capabilities available to an agent and call center. The CFGS call flows reduce average handle time (AHT) and increase first call resolution (FCR). The CFGS provides an efficient and cost effective way to improve learning adoption rates and training timelines for call center agents.

Call flows employ multiple nodes to represent process steps and logical categories of information within a process. The CFGS call flows include one or more nodes and one or more display sections. A display section includes a set of nodes for display and interaction with an agent. In one implementation, when the CFGS renders the display section, each display section fits within a screen bound that eliminates scrolling to reach any of the nodes of a set of nodes within the display section. Each display section may include a unique set of nodes. Call flows include various types of nodes such as note nodes, bridging nodes, and transition nodes. Call flows also include various types of links that provide navigation between nodes, and connectors between nodes that show where nodes are joined and indicate information that may be needed to move from one node to another within a call flow.

The CFGS may use colors, patterns and/or other identifiers to emphasize distinctions between different nodes and between different links. For example, the CFGS may employ a specific note link emphasis definition for each note node, an internal-flow link emphasis definition for each bridging node, and a cross-flow link emphasis definition for each transition node. In another implementation, the CFGS employs a connector specific note link emphasis definition.

The CFGS uses a node specific note link and a connector specific note link embedded in note nodes and connectors, respectively, to display troubleshooting information specific to the note nodes and connectors. The CFGS may display probing questions and actions corresponding to the node specific note links and connector specific note links that assist the agent to efficiently identify the support issue. The CFGS uses node specific note links and connector specific note links throughout a call flow to provide references and tips, so that an agent has quick access to information that can assist the agent to resolve a customer support issue accurately. The CFGS presents probing questions and actions in display sections so that the agent can quickly and accurately identify the support issue to resolve, and an appropriate protocol to resolve the issue, reduce AHT and improve FCR. The CFGS uses an internal-flow link embedded in a bridging node to transition from one display section to another display section of a call flow. The CFGS uses a cross-flow link embedded in a transition node to transition from the display of one call flow to a different call flow. The CFGS improves the ability of the agent to provide support and aides in troubleshooting by providing fast navigation and direct links to pertinent the CFGS material.

The CFGS uses a call flow guidance program (CFGP) to facilitate interaction with the node specific note link, the internal-flow link, and the cross-flow link. The guidance program provides a navigation menu that includes call flow selections that render a display section of a call flow in response to a navigation menu selection. The call flow selections allow the agent to navigate directly to a specific flow. For example, an agent may select a node specific note link that renders a probing question that assists the agent to identify and troubleshoot the issue more efficiently and effectively. As a result of reviewing the probing question, the agent may navigate directly to a particular part of the call flow or a different call flow by selecting an internal-flow link or cross-flow link, respectively.

The CFGS solves the extraordinary technical problems associated with improving AHT, FCR, navigation through a maze of complex call flows, adoption rates and training timelines for agents by providing a dynamic call flow tool with multiple call flow options, dynamic content, and the capability to monitor and measure the effectiveness of the tool, and adoption rates and training timelines of agents for service areas supported by the agents.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system and tool may be better understood with reference to the following drawings and description. The elements in the figures are not necessarily to scale, emphasis instead being placed upon illustrating the principles of the capability analysis techniques. In the figures, like-referenced numerals designate corresponding parts throughout the different views.

DETAILED DESCRIPTION OF THE PREFERRED EMBODIMENTS

Figure 1:
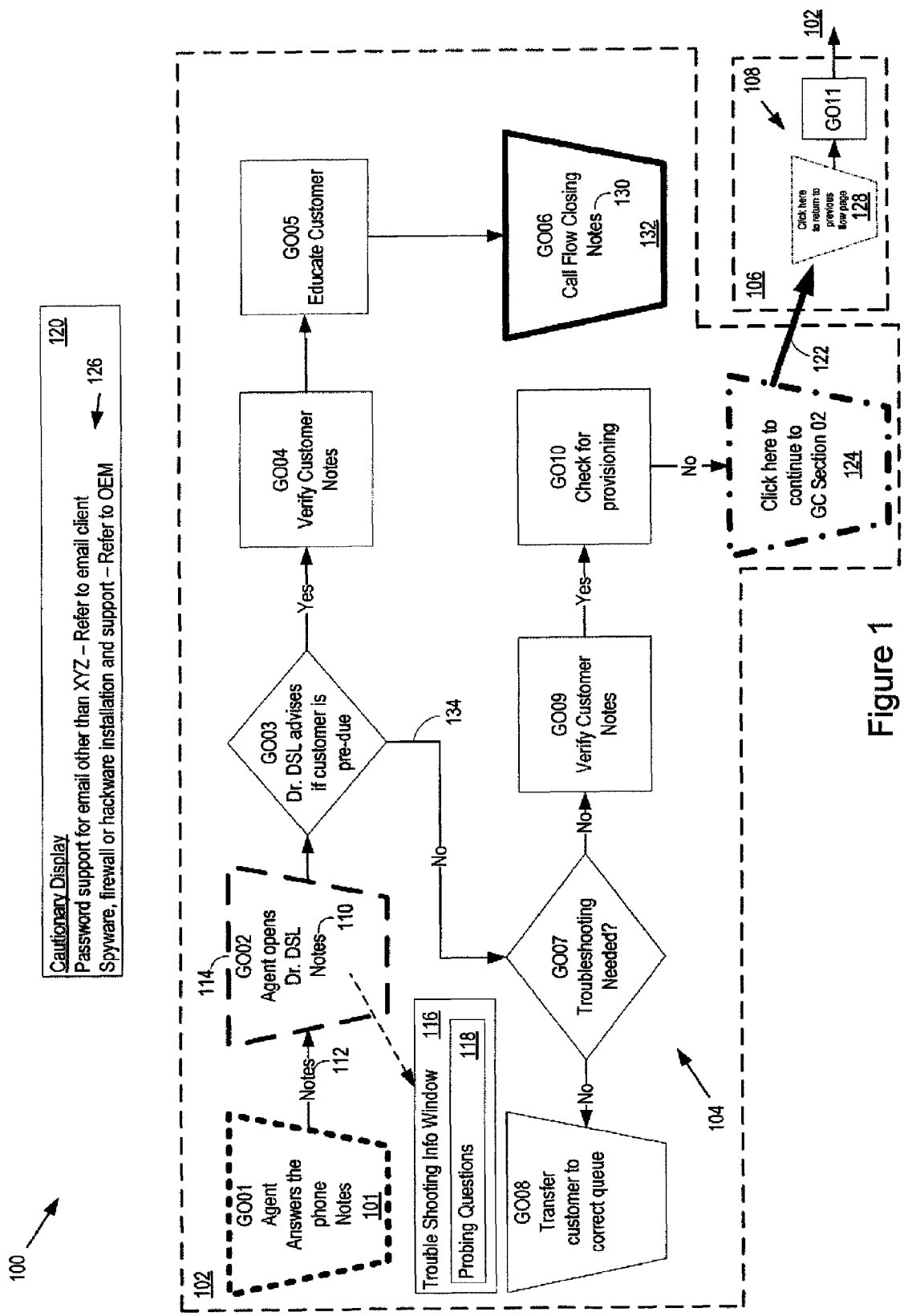
FIG. 1 shows two display sections of a call flow.

The CFGS divides call flows along logical boundaries referred to as display sections. Each display section may include one or more nodes, connectors and links. In one implementation, the CFGS uses a data structure that associates nodes, and connectors and links between the nodes to represent a call flow definition. As one example, the CFGS may implement the data structure of a call flow definition in an XML (eXtensible Markup Language) file. The CFGS provides joint display and interaction capabilities such that a display section divides a call flow into intelligible portions and renders multiple process steps of a call flow simultaneously in each portion. Operator interactions may include selecting links and navigation menu selections using cursor keys, voice commands, and/or mouse-over actions and clicking selections with an electronic pointer such as a mouse. The CFGS operator interactions may include selection of node specific note links, connector specific note links, internal-flow links and cross-flow links. The CFGS joint display and interaction capabilities improve readability of the call flow and call flow comprehension by the agent. The CFGS provides the agent access to content in a display section of a call flow and renders additional information, and tips on specific process steps within a call flow from various sources. In one implementation, the CFGS retrieves dynamic information from a knowledge management system and/or the website of a vendor of a product for which the call center provides support services.

The call flow definition establishes note nodes. A note node provides node-specific information tailored to one or more process steps represented by the node and instructs the agent regarding how to complete the process steps. In one implementation, the note node retrieves dynamic content from a data source such as a database. A note node (such as an initial call flow node) may provide an opening script to assist a new agent and ensure that the new agent covers specific points on the opening scripts each occasion the new agent transitions to the corresponding call flow. A note node (such as a terminal call flow node) may also provide a closing script to assist the agent and ensure that the new agent covers specific points on the closing script.

In one implementation, the CFGS includes connector specific note links that are embedded in connectors (e.g., displayed as arrows or lines) between nodes that inform the agent as to what to say or do next, so that the agent understands how to move from one process step to another. Connector specific note links and node specific note links may be attached to, associated with or implemented in any manner that establishes a link between connector specific note links and corresponding connectors, and node specific note links and corresponding note nodes. For example, a connector specific note link may provide the agent a checkpoint to indicate what information the agent should have at a particular point in the call flow and/or minimum mandatory information needed before performing another process step. When an agent activates a node specific note link, the CFGS responds by rendering a trouble shooting information window that provides probing questions that the agent can use to perform consistent troubleshooting across multiple vendors and locations. The node notes and connector specific note links allow an agent to move through a call flow faster as the agent becomes more experienced with the particular call flow. An agent may read the content of node notes and connector specific note links of a call flow until the agent understands every detail of the call flow, and begin to rely on the node notes and connector specific note links less on every occasion.

The CFGS may use colors, patterns and/or other rendering styles to emphasize distinctions between different nodes and between different links. The emphasis definitions may be stored in a database, configuration file, or otherwise established, and may be dynamic or static. For example, the CFGS may render the border of a node in green to emphasize the beginning of a call flow, render the border for a node in red to emphasize a new call flow, and render the border for a node in blue to emphasize the continuation of a call flow. The CFGS may further employ a node specific note link emphasis definition for each note node, an internal-flow link emphasis definition for each bridging node, and a cross-flow link emphasis definition for each transition node. The CFGS may also employ a connector specific note link emphasis definition.

When an agent selects a note node, the CFGS displays additional information to the agent to assist the agent in quickly troubleshooting an issue, with specific applicability to the process captured in the note node. In one implementation, when an agent selects a note node, the CFGS displays links to specific articles, actual article text, or other information in a given support service area that the agent can review to further improve the support provided by the agent and reduce the AHT of the agent. The node notes may include probing questions and actions that assist the agent to efficiently identify the support issue.

For example, a customer may indicate that they do not have access to e-mail, and a new agent may not have the experienced to ask the appropriate probing questions to identify the issue. The CFGS provides probing questions within the node notes of the call flow to assist the new agent in the event the new agent does not intuitively know to ask the appropriate probing question. The probing question may inform the new agent to move to an e-mail call flow and start troubleshooting accordingly. Based on the process steps provided in each call flow and the probing questions in the note nodes, the new agent may quickly determine that the customer does not have a problem with their e-mail, but the customer has a problem with connectivity overall. The CFGS assists the new agent in identifying the issue as an intermittent connectivity issue and provides the call flow for intermittent connectivity. The CFGS may provide a note node that includes a closing script that the agent can use to close the call once the agent has reached issue resolution.

The CFGS includes flagged subject matter specific to a call flow that identifies subject matter consider relevant to the call flow. The CFGS renders a cautionary display based on flagged subject matter outside the call flow. In one implementation, the CFGS includes flagged subject matter specific to a display section that identifies subject matter considered outside the scope of the display section and renders a cautionary display based on flagged subject matter outside the display section. The flagged subject matter definition assists the agent to avoid attempting to troubleshoot issues outside the scope of a call flow and/or display section, which improves AHT. In one implementation, for each display section of a call flow, the CFGS renders a cautionary display that includes a list of commonly unsupported issues specific to the call flow or the display section. The cautionary display serves to ensure that the agent does not attempt to resolve issues outside the scope of support and provide a more consistent customer experience. In other words, the CFGS assists agents to consistently and uniformly resolve issues, and consequently, a consistent customer experience results.

For example, after the agent uses the probing questions to communicate with a customer the agent may decide to transition to another call flow more appropriate for resolving the issue. The agent can select the cross-flow link embedded in a transition node to transition to the desired call flow. By selecting the cross-flow link embedded in the transition node the agent transitions to the appropriate call flow determined by the agent. When the agent selects the cross-flow link embedded in the transition node, the agent is immediately directed to the start of the referenced call flow. The CFGS may embed internal-flow links and cross-flow links in bridging nodes and transition nodes, respectively, so that upon agent selection of the border and/or area within a bridging node or transition node the CFGS activates the embedded internal-flow link and cross-flow link. To further help speed troubleshooting by the agent, the CFGS navigates to the referenced call flow start which outlines helpful troubleshooting and probing questions. Once the agent has mastered the use of the probing questions for a note node, display section and/or call flow, the agent can quickly narrow the focus of troubleshooting the issue.

Figure 4:
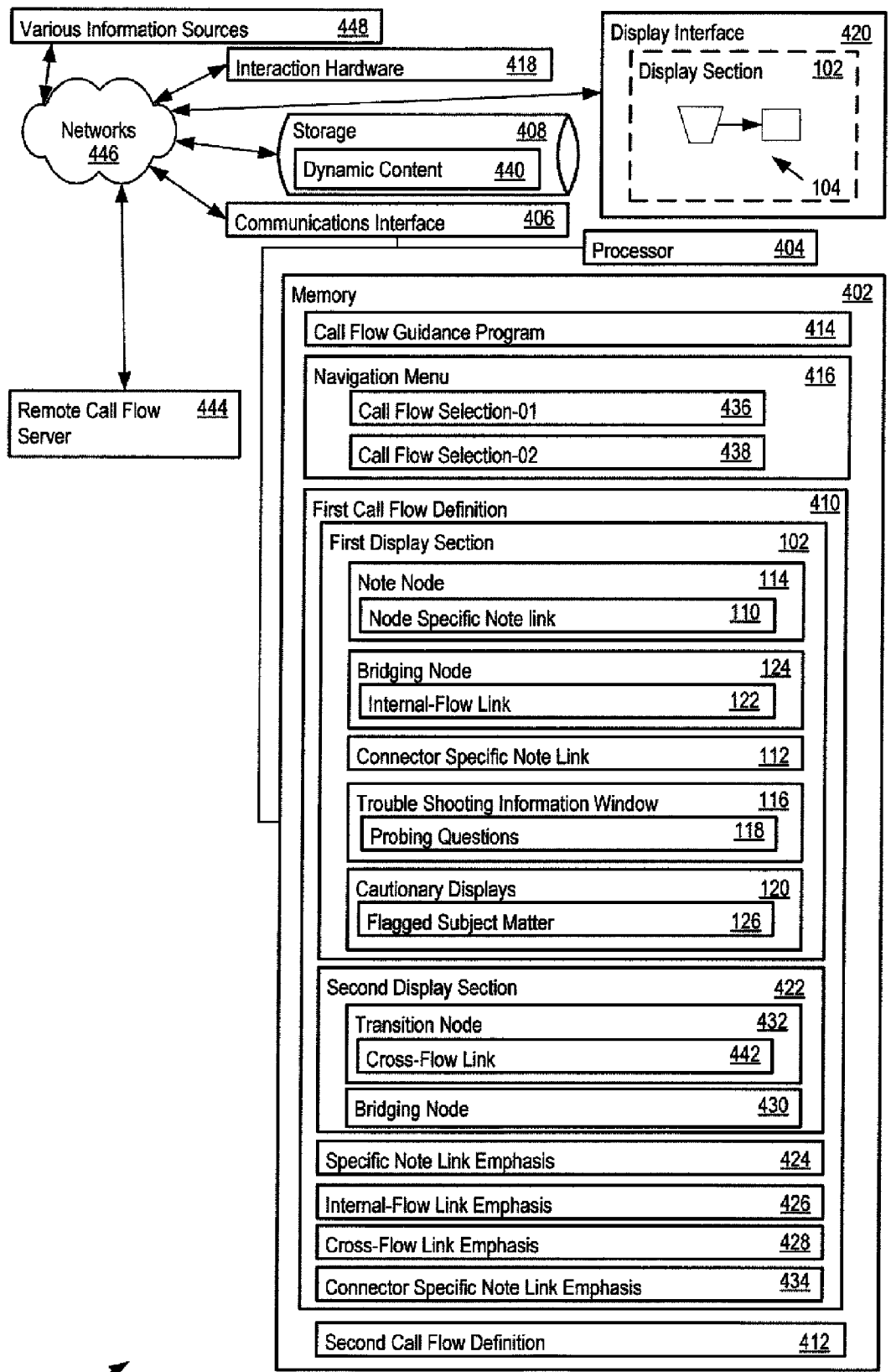
FIG. 4 shows one example implementation of the CFGS.

FIG. 1 shows two display sections of a call flow 100 established in the call flow guidance system (CFGS) 400 illustrated in FIG. 4. The CFGS 400 will be described in detail further below. The first display section 102 includes a first set of multiple nodes 104 that correspond to a selected portion of all of the process steps of the call flow 100 and provides interactive capabilities to the agent to navigate the call flow 100. The second display section 106 includes a second set of multiple nodes 108 that also correspond to a portion of the process steps of call flow 100 and provides interactive capabilities to the agent to navigate call flow 100. Although FIG. 1 shows the display section 102 and 108 including multiple nodes, any display section established in the CFGS 400 may include only a single node.

The CFGS 400 divides a call flow into multiple display sections so that each display section fits within a screen bound, thereby eliminating the need to scroll through nodes in order to reach any of the nodes within the display section. In one implementation, the CFGS 400 receives the specifications for the display device used by an agent as a result of directing the agent to select each of the four corners of the viewable display area with a pointing device, or in the case of a touchscreen, touching the four corners of the viewable display area. The CFGS 400 may direct the agent to perform this activity the first time the agent uses the CFGS 400 and/or when the agent's hardware configuration changes (e.g., a new screen is installed). In another implementation, the call flow guidance program (CFGP) 414, illustrated in FIG. 4, receives the specifications for the display device by interrogating the system parameters of the operating system running the CFGP 414. The CFGS 400, based on the viewable display area screen bound, determines the optimal number of display sections and sets of multiple nodes corresponding to the display sections to render a call flow that does not require scrolling to reach any set of multiple nodes within corresponding display sections. In another implementation, the CFGS is preconfigured with call flow sections based on one or more specified screen resolutions. For example, the CFGS may establish call flow sections tailored to 1024×768, 1600×1200, 1920×1080 or any other screen resolution. The screen resolutions may be determined in advance based on a review of the hardware employed at any particular call center. The CFGS may determine the viewable display area screen bound based on whether an agent uses a multi-screen configuration and aggregate the dimensions of the combination of screens. As another example, the operator may specify the screen resolution, and the CFGS may use one or many predefined sets of call flow sections and sets of multiple nodes. Accordingly, the CFGS may deliver the same call flow using different call flow sections on different resolution screens within the same call center.

The first display section 102 includes an initial call flow node 101, a node specific note link 110 and a connector specific note link 112. The CFGS 400 may establish an initial call flow node 101 for each call flow 100. The node specific note link 110 is embedded in the note node 114 and provides an interactive link (e.g., a hyperlink) that the agent can select. When the agent activates the node specific note link 110, the CFGS 400 responds by rendering the trouble shooting information window 116. The trouble shooting information window 116 may provide probing questions 118 that assist agents to perform consistent troubleshooting across multiple vendors and locations. The trouble shooting information window 116 may also provide scripts and/or call flow navigation suggestions.

In one implementation, the connector specific note link 112 identifies particular information or actions needed as prerequisites to moving from one node to another within call flow 100. For example, the agent may need to verify the identity of the caller before proceeding to troubleshoot a particular issue (e.g., password reset). When an agent activates a connector specific note link 112, the CFGS retrieves connector specific notes from storage and renders and displays the connector specific note in a location approximate to the connector specific note link within the display section.

Table 1 shows an example of connector specific notes that may be displayed by an activated connector specific note link 112. The connector specific note shown in Table 1 indicates the type of information required to verify a customer and when the verification is required (e.g., only when changing account information). Any other helpful content may be provided in response to activation of a connector specific note link.

TABLE 1

Notes displayed by an activated Connector Specific Note Link

Verification (Only when changing account information or resetting passwords; and differentiate between business, residential and Call Center employee calling).
Social Security Number
Address
Customer billing code
 Only 1 of above needed

Table 2 shows node specific note link probing questions 118 for a connectivity issue. The CFGS 400 retrieves probing questions from memory and/or a database when an agent activates a corresponding node specific note link 110 embedded in a note node 114, and renders and displays the probing questions in a trouble shooting information window 116 in a location approximate to the node specific note link within the display section. The probing questions 118 assist the agent to quickly target the specific connectivity issue for which the caller needs support.

TABLE 2

Probing Questions

Troubleshooting Questions article located at:
Processes → RCHC → Call Handling → Tier 1 Probing Questions
Are you in front of the computer and is it turned on?
Are you able to browse?
Are there any error messages?
When did the issue start? Intermittent or ongoing?
Have you been able to insert broken action here before?
Have you made any changes to your system?
Have you recently installed/deleted any software or hardware?
Physical movement of hardware (e.g., modem or filters)?
Has anything changed in your household (e.g., changes to phone system, additional phone lines, burglar alarm, satellite television, answering machine, or fax)?
Have you checked all the cables for a tight fit?
Do you have multiple computers connected? Are you having issues with one or all computers (Note response)?
Are you using a router? If yes, note router may need to be removed from the configuration as part of troubleshooting.
Are you using a wireless modem?
Type of modem being used? What is the status of lights on the modem?

TABLE 2-continued

Probing Questions

What operating system are you using?
Are you running any third party software that could be affecting service (e.g., firewalls, anti-virus, or parental controls)?

The first display section 102 also includes a cautionary display 120, and an internal-flow link 122 embedded in a bridging node 124. In one implementation, the CFGS 400 automatically renders and displays a cautionary display 120 for each call flow without agent interaction. As another example, the CFGS 400 renders and displays a cautionary display 120 corresponding to each display section. The cautionary display 120 serves to ensure that the agent does not attempt to troubleshoot issues outside the scope of support and provide a more consistent customer experience. The cautionary display 120 lists information and issues outside the scope of support based on flagged subject matter 126 associated with the display section 102 and/or call flow 100. The cautionary display 120 and the flagged subject matter 126 assist agents to avoid attempting to troubleshoot issues that are outside the scope of support, and uniformly and quickly resolve issues within the scope of support.

The agent may learn from the node specific note links 110, connector specific note links 112 and trouble shooting information windows 116 until the agent gains experience with call flow 100 and/or display sections (e.g., 102 and 106) within call flow 100. For example, the agent, after becoming familiar with display sections 102, may review the information provided by the caller and immediately select the internal-flow link 122 embedded in the bridging node 124 without reviewing the node specific note links 110, connector specific note links 112 or trouble shooting information windows 116. When the agent activates the internal-flow link 122, the CFGS 400 transitions from the first display section 102 to the second display section 106 with the second set of multiple nodes 108 corresponding to another portion of the process steps of call flow 100. The agent may determine, while trouble shooting the issue through the second display section 106, that the first display section 102 includes other information needed to resolve the issue, and select the bridging node 128 to return to the first display section 102. The bridging nodes (e.g., 124 and 128) assist the agent to quickly acquire troubleshooting information and improve call handling. The agent may select the node specific note link 130, embedded in a terminal note node 132, that includes a closing script that the agent may use to ensure that selected information is communicated to the customer, and collected and recorded before closing an issue. The closing script further assists the agent to provide a consistent and uniform customer experience.

Figure 2:
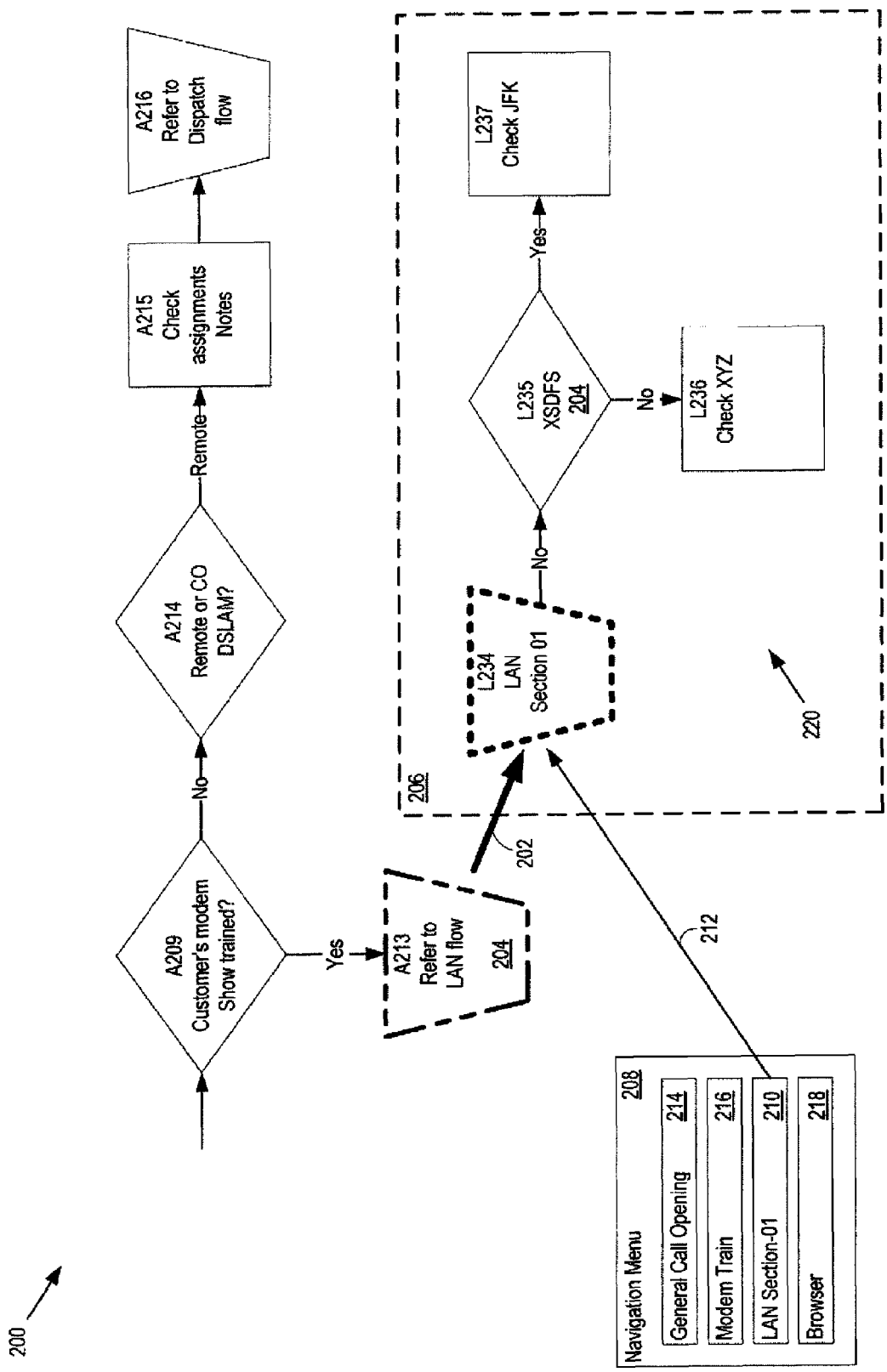
FIG. 2 illustrates a cross-flow link embedded in a transition node.

FIG. 2 illustrates a cross-flow link 202 embedded in a transition node 204. In one implementation, the CFGS 400 associates each cross-flow link 202 of a particular call flow with a different call flow so that when an agent selects the cross-flow link 202 embedded in the particular display section the CFGS 400 renders and displays the different call flow 206. In one implementation, the CFGS 400 analyzes the cross-flow link 202 against the call flow definitions represented as data structures in XML files to identify the corresponding call flow and display sections. In another implementation, the CFGS 400 uses the cross-flow link to form a query that searches a database for the corresponding call flow and display sections.

Prior to rendering and displaying each call flow and display section, the CFGS 400 may analyze the multiple sets of nodes of each call flow and determine the nodes that represent transition nodes 204 and embed a cross-flow link in each transition node corresponding to different call flows. In other implementations, the cross-flow links are pre-defined in each call flow. The CFGS 400 may establish transition nodes based on analyzing call flows and determining that a logical relationship exists between the call flows at one or more call flow nodes within one or more of the call flows. In one implementation, the CFGS 400 establishes cross-flow links within each of the logically related call flows such that at least two cross-flow links exist to transition to and from at least two call flows. In another implementation, the CFGS 400 may dynamically update call flow definitions represented as data structures in XML files and relationships definitions for call flows with the results of the analysis used to identify the transition nodes and cross-flow links. As another example, the CFGS 400 may dynamically update call flow definitions and relationship definitions for a call flow in a database with the results of the analysis used to identify the transition nodes and cross-flow links.

The agent may review a current set of multiple nodes 200 of call flow 100 and decide to select a transition node 204 that transitions to a different call flow 206. An agent familiar with the current set of multiple nodes 200, or experienced with the issue the agent is troubleshooting, may avoid reviewing each node of the current set of multiple nodes 200, and immediately select from a navigation menu 208 one of a number navigation menu selection items. In one implementation, the navigation menu 208 includes call flow selections that direct the CFGS 400 to render a display section of a call flow in response to a navigation menu selection. For example, rather than selecting the transition node 204, the agent may select the LAN section-01 210 navigation menu item to transition from call flow 100 to the different call flow 206. In one implementation, the LAN section-01 display section 220 may represent the first in a sequence of display sections within the different call flow 206. In another implementation, the LAN section-01 210 navigation menu item transitions the agent to a particular display section that is not the first of multiple display sections within the different call flow 206.

Figure 3:
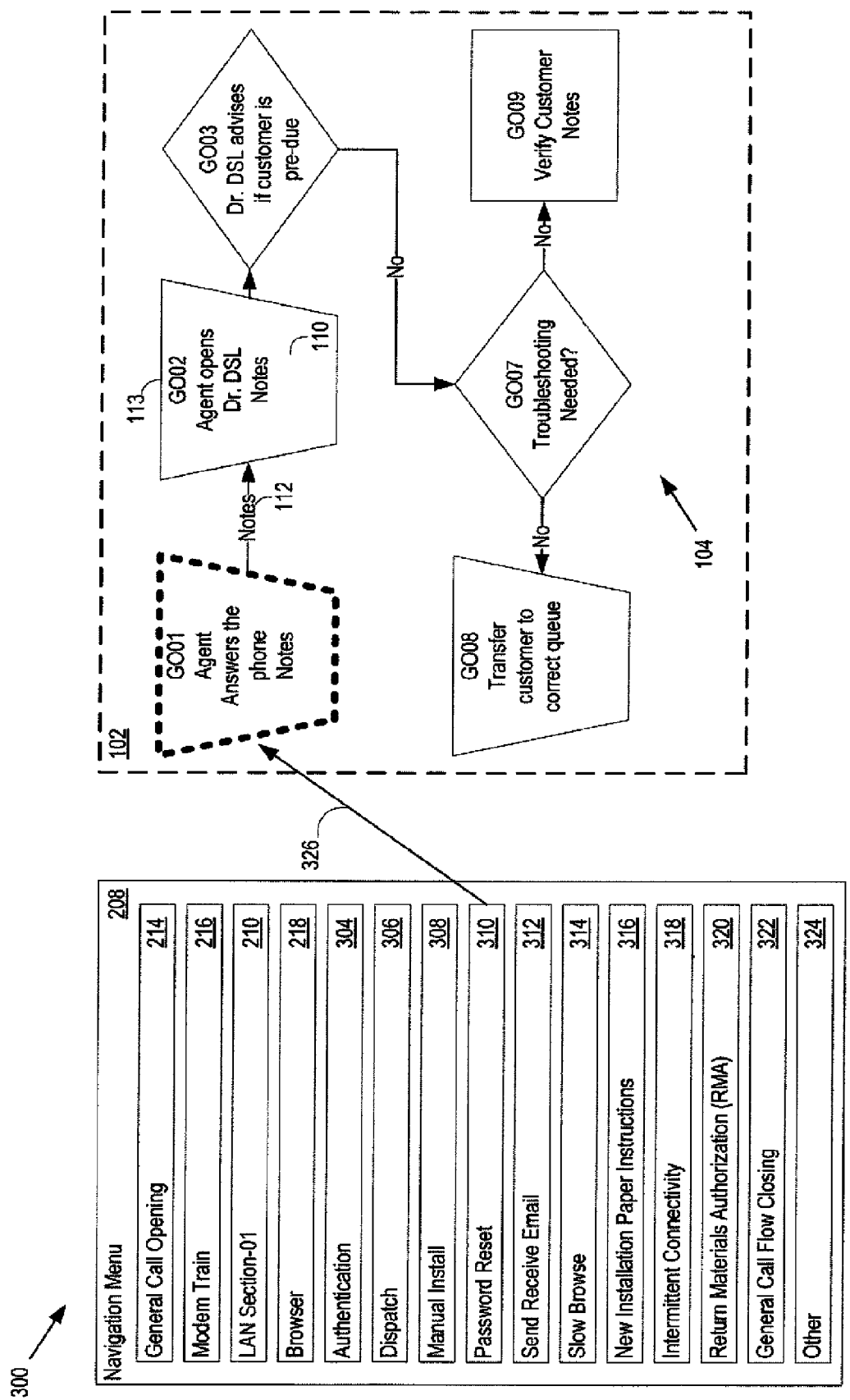
FIG. 3 illustrates a call flow display section with a navigation menu.

FIG. 3 illustrates a CFGS display section 300 with the navigation menu 208 and call flow selections (e.g., 210, 214-218, 304-324) that transition an agent from one call flow to another call flow. In response to a call flow selection from the navigation menu, the CFGS 400 renders and displays a display section of a corresponding call flow. In one implementation, the CFGS 400 analyzes the call flow selection against the call flow definitions represented as data structures in XML files to identify the corresponding call flow and display sections. In another implementation, the CFGS 400 uses the call flow selection to form a query that searches a database for the corresponding call flow and display sections. An agent familiar with the issue that the agent is troubleshooting may immediately select from the navigation menu 208 one of a number of call flow selections. Alternatively, the agent may navigate to a transition node (e.g., the transition node 204) in a call flow (e.g., the call flow 100) and transition to a different call flow (e.g., the call flow 206) by selecting a cross-flow link (e.g., the cross-flow link 202). The agent has the flexibility of relying on the CFGS 400 to assist in determining whether to transition to a different call flow 206 and independently deciding when to transition to a different call flow 206.

FIG. 4 shows an example implementation of the CFGS 400. The CFGS 400 includes a memory 402, a processor 404 coupled to the memory 402, a communications interface 406, and storage 408. The memory 402 includes call flow definitions (e.g., a first call flow definition 410 and a second call flow definition 412), a call flow guidance program (CFGP) 414 that the processor 404 executes and a navigation menu definition 416. The CFGS 400 also includes interaction hardware 418 used to receive agent interactions, and a display interface 420.

In one implementation, the CFGS 400 implements call flow definitions as data structures in XML (eXtensible Markup Language) files. In another implementation, the CFGS 400 implements call flow definitions as data structures in one or more databases. The CFGS 400 may store the call flow definitions as data structures in storage 408 for subsequent retrieval and update. Call flow definitions include multiple display sections (e.g., the first display section 102 and a second display section 106). In one implementation, call flow definitions include specific note link emphasis 424, internal-flow link emphasis 426 and cross-flow link emphasis 428 that indicate colors, patterns and/or other identifiers to use to emphasize distinctions between various links embedded in different node types (e.g., note nodes 114, bridging nodes 124 and 430, and transition nodes 432). In one implementation, the first call flow definition 410 includes a connector specific note link emphasis 434 that indicates colors, patterns and/or other identifiers to use to emphasize distinctions between various connector specific note links 112. For example, a red colored connector specific note link may indicate minimum mandatory information that the agent should acquire before transitioning to another node in the call flow (e.g., authentication information when resetting a password and/or updating account information).

The CFGP 414 facilitates agent interactions with node specific note links, internal-flow links, cross-flow links, connector specific note links 110, and navigation menu selections (e.g., call flow selection-01 436 and call flow selection-02 438). The interaction hardware 418 receives and transmits operator interactions to the CFGP 414 for processing. The interaction hardware 418 may include cursor keys, touch screens, voice recognition systems, and/or electronic pointing devices such as a mouse. The interaction hardware 418 receives operator interactions that may include link and navigation menu selections made with an electronic pointing device, as well as touchscreen touches and mouse-over actions. In one implementation, the display sections are remote to the CFGS 400, and in response to the operator interactions received by the interaction hardware 418 the communications interface 406 transmits renderings of the display sections (e.g., 102, 106 and 422) and navigation menus 416 from the CFGP 414 to the display interface 420 across a network 446.

As described above, navigation menus include call flow selections. The CFGP 414 receives a navigation menu selection and renders a display section 102 in response to the navigation menu selection. The CFGP 414 also renders cautionary displays 120 based on flagged subject matter 126 identified as outside of a display section 102. The flagged subject matter 126 may be received from various sources (e.g., vendor of a particular product, field support information and call center management) and dynamically change the content rendered by the CFGP 414 in the cautionary display 120 and identified as outside the scope of a display section. For example, a vendor may provide newly identified information that indicates a procedure for resolving a particular issue previously considered outside the scope of a display section.

In one implementation, the CFGP 414 monitors and measures the effectiveness of the CFGS 400, the adoption rate and training timelines of agents, and calculates AHT and FCR.

For example, the CFGP 414 may record the interactions of an agent with time stamps and the disposition of each customer call, in order to calculate AHT and FCR. The CFGP 414 may identify trends in agent interactions based on the frequency in which an agent uses particular nodes, links and/or connectors, and determine how often the agent relies on particular nodes, links and/or connectors, and analyze AHT and FCR for the agent based on the agent interactions. The results of the analysis may be used to assist the agent to improve their adoption rate and training timelines.

The CFGS 400 may use XML files to store any number of call flow definitions as data structures, including multiple definitions of the same call flow divided into different call flow sections (e.g., dependent on expected screen resolution). In another implementation, the CFGS 400 uses a database to store and maintain the call flow definitions as data structures. The CFGP 414 may retrieve dynamic content 440 from storage 408 to render probing questions 118 in the troubleshooting information windows 116 and/or flagged subject matter 126 in the cautionary displays 120. In one implementation, the CFGP 414 uses the dynamic content 440 to render information in the note nodes, bridging nodes and transition nodes. For example, the storage 408 receives new and/or additional support information for a product from a vendor, stores the support information in the first call flow definition 410 and the CFGP 414 renders the first display section 102 based on the support information. In one implementation, the CFGP 414 bases transitions between nodes and between call flows on the dynamic content 440 in order to obtain adaptive call flow definitions. For example, the dynamic content 440 may include a newly identified best practice for troubleshooting a particular issue that identifies a replacement call flow for a previously used call flow. The CFGP 414 analyzes the dynamic content 440 and renders cross-flow link 442 to transition to the replacement call flow based on the newly identified best practice. In one implementation, the CFGP 414 dynamically renders the call flow definition for the replacement call flow based on the dynamic content 440.

In one implementation, the CFGS 400 includes a remote call flow server 444 that dynamically updates call flows by transmitting the updated call flows to the CFGS 400 via the network 446 (e.g., the Internet). The CFGS 400 responsively updates the database 408 with the updated call flows. In another implementation, the remote call flow server 444 receives updated call flow information from various information sources 448 (e.g., vendor of a particular product, field support information and call center management) and generates updated call flows by analyzing the updated call flow information.

Figure 5:
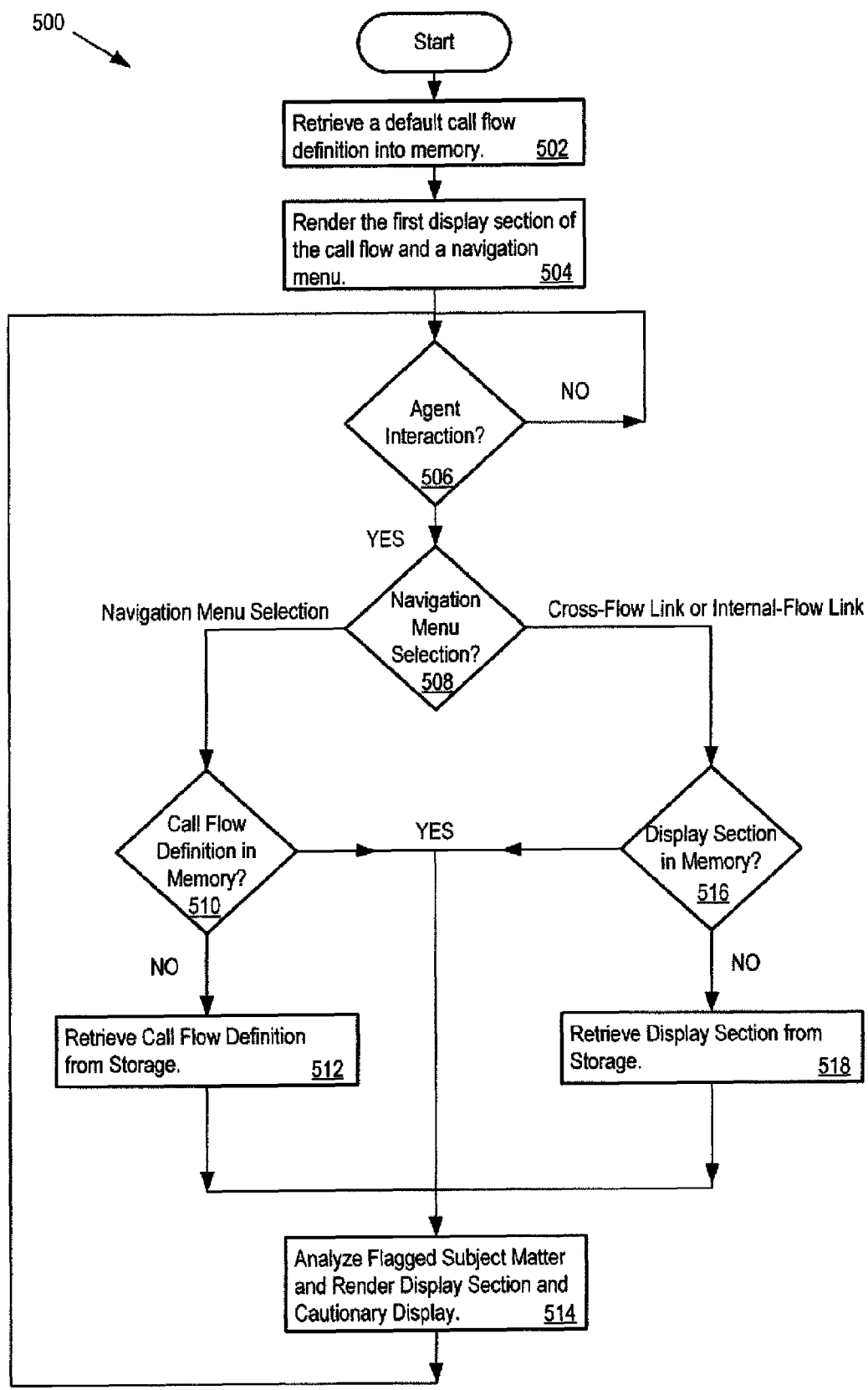
FIG. 5 shows the logic flow the call flow guidance program (CFGP) may take to render and display a display section.

FIG. 5 shows the logic flow the CFGP 414 may take to render and display a display section. In one implementation, the CFGP 414 retrieves into memory 402 call flow definitions (e.g., first call flow definition 410 and second call flow definition 412) from XML files stored in storage 408 (502). The call flow definitions may be based on dynamic content 440 also stored in storage 408. The CFGP 414 analyzes the first call flow definition 410 to determine the specific note link emphasis 424, internal-flow link emphasis 426 and cross-flow link emphasis 428 indicating the colors, patterns to use to emphasize distinctions between the connectors, links and node embedded in the call flow definition 410. In one implementation, the CFGP 414 renders a navigation menu 416 corresponding to a display section and/or call flow definition. In another implementation, the CFGP 414 renders a uniform navigation menu 416 corresponding to all display sections and/or call flow definitions. The CFGP 414 analyzes the flagged subject matter 126 to determine whether to render and display a cautionary display 120 corresponding to the call flow definition and/or display section. The CFGP 414 renders the first display section 102 as a default display section for the call flow definition and the navigation menu 416 (504) and waits for an agent interaction (e.g., operator inputs) (506).

When the CFGP 414 receives an agent interaction, the CFGP 414 analyzes the agent interaction to determine what type of interaction the CFGP 414 has received (508). In the event the CFGP 414 determines that the agent interaction is a navigation menu selection of a new call flow selection (e.g., call flow selection-01 436 and call flow selection-02 438), the CFGP 414 searches memory 402 for the new call flow definition corresponding to the call flow selection (510). In one implementation, in the event the new call flow definition corresponding to the call flow selection is not found in memory 402, the CFGP 414 retrieves the new call flow definition from a corresponding XML file stored on storage 408 and loads the new call flow definition into memory 402 (512). The CFGP 414 analyzes the flagged subject matter 126 to determine whether to render and display a cautionary display 120 corresponding to the call flow definition and/or display section. The CFGP 414 displays the new first display section of the new call flow definition, in response to the navigation menu selection and the CFGP 414 waits for another agent interaction (514).

In the event the CFGP 414 determines that the agent interaction is a cross-flow link 422, the CFGP 414 searches memory 402 for the display section corresponding to the cross-flow link 422 (516). In one implementation, in the event the display section corresponding to the cross-flow link 422 is not found in memory 402, the CFGP 414 retrieves the display section corresponding to the cross-flow link 422 from a database stored on storage 408 and loads the display section corresponding to the cross-flow link 422 into memory 402 (518). The CFGP 414 renders and displays the display section corresponding to the cross-flow link 422 and the CFGP 414 waits for another agent interaction (506). In one implementation, rendering a display section includes identifying the connectors, links and nodes of a call flow definition, dividing the call flow into multiple display sections so that each display section fits within a screen bound that eliminates scrolling to reach any of the nodes of a set of nodes within a given display section, and further includes analyzing the layout of the connectors, nodes and links with respect to each other within each display section of the call flow. The CFGP 414 analyzes the flagged subject matter 126 to determine whether to render and display a cautionary display 120 corresponding to the call flow definition and/or display section.

In the event the CFGP 414 determines that the agent interaction is an internal-flow link 122, the CFGP 414 searches memory 402 for the display section corresponding to the internal-flow link 122 (516). In one implementation, in the event the display section corresponding to the internal-flow link 122 is not found in memory 402, the CFGP 414 retrieves the display section corresponding to the internal-flow link 122 from a database stored on storage 408 and loads the display section corresponding to the internal-flow link 122 into memory 402 (518). The CFGP 414 analyzes the flagged subject matter 126 to determine whether to render and display a cautionary display 120 corresponding to the call flow definition and/or display section. The CFGP 414 renders (514) and displays the display section corresponding to the internal-flow link 122 and the CFGP 414 waits for another agent interaction (506).

Figure 6:
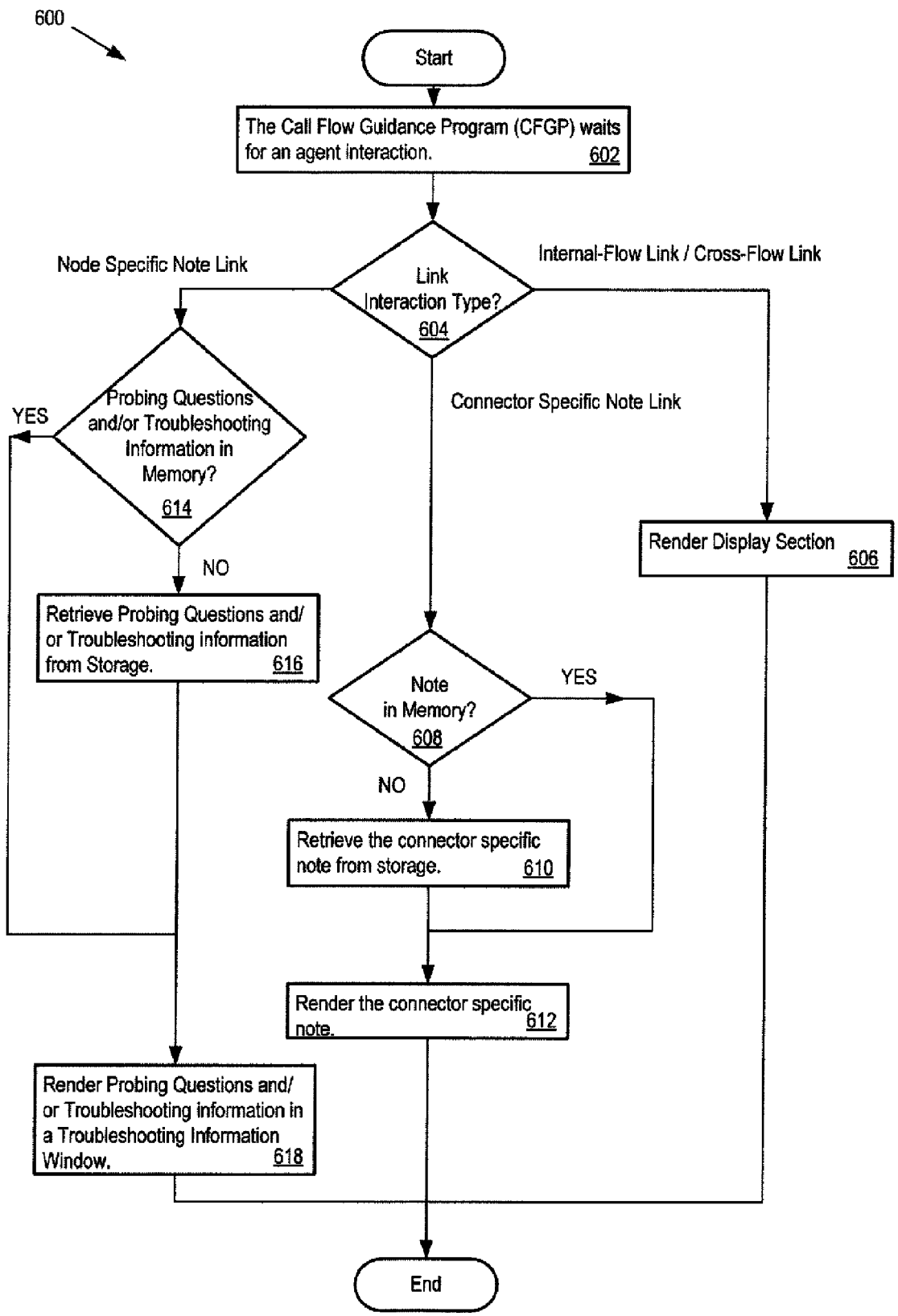
FIG. 6 shows the logic flow the CFGP may take to monitor for and respond to link activation, such as by rendering and displaying a new call flow display section.

FIG. 6 shows the logic flow the CFGP 414 may take to render and display a note based on a link interaction. The CFGP 414 waits to receive an agent interaction (602) and determines what type of link interaction the CFGP 414 has received (604). In the event the agent interaction is an internal-flow link or a cross-flow link, the CFGP 414 performs the logic as discussed above in FIG. 5 to render and display the appropriate display section (606). For example, for an internal-flow link, the CFGP 414 retrieves and displays the appropriate display section of the current call flow corresponding to the internal-flow link 122. In contrast, for a cross-flow link, the CFGP 414 retrieves and displays the appropriate display section of a different call flow corresponding to the cross-flow link 122. In one implementation, a cross-flow link corresponds to the first display section of a call flow. In another implementation, a cross-flow link corresponds to a particular display section of a different call flow, but the particular display section is not necessarily the first display section of the different call flow. In the event the interaction type is a connector specific note link 112, the CFGP 414 searches the memory 402 for the corresponding connector specific note (608). In the event the connector specific note is not found in memory 402, the CFGP 414 retrieves the connector specific note from storage 408 (610). The CFGP 414 renders and displays the connector specific note in a location approximate to the connector specific note link within the display section (612).

In the event the interaction type is a node specific note link 110, the CFGP 414 searches the memory 402 for information and/or the probing questions 118 corresponding to the node specific note link 110 (614). In the event the node specific note is not found in memory 402, the CFGP 414 retrieves the information and/or the probing questions 118 corresponding to the node specific note link 110 from storage 408 (616). The CFGP 414 renders and displays the information and/or the probing questions 118 in a troubleshooting information window 116 in a location approximate to the node specific note link within the display section (618).

Figure 7:
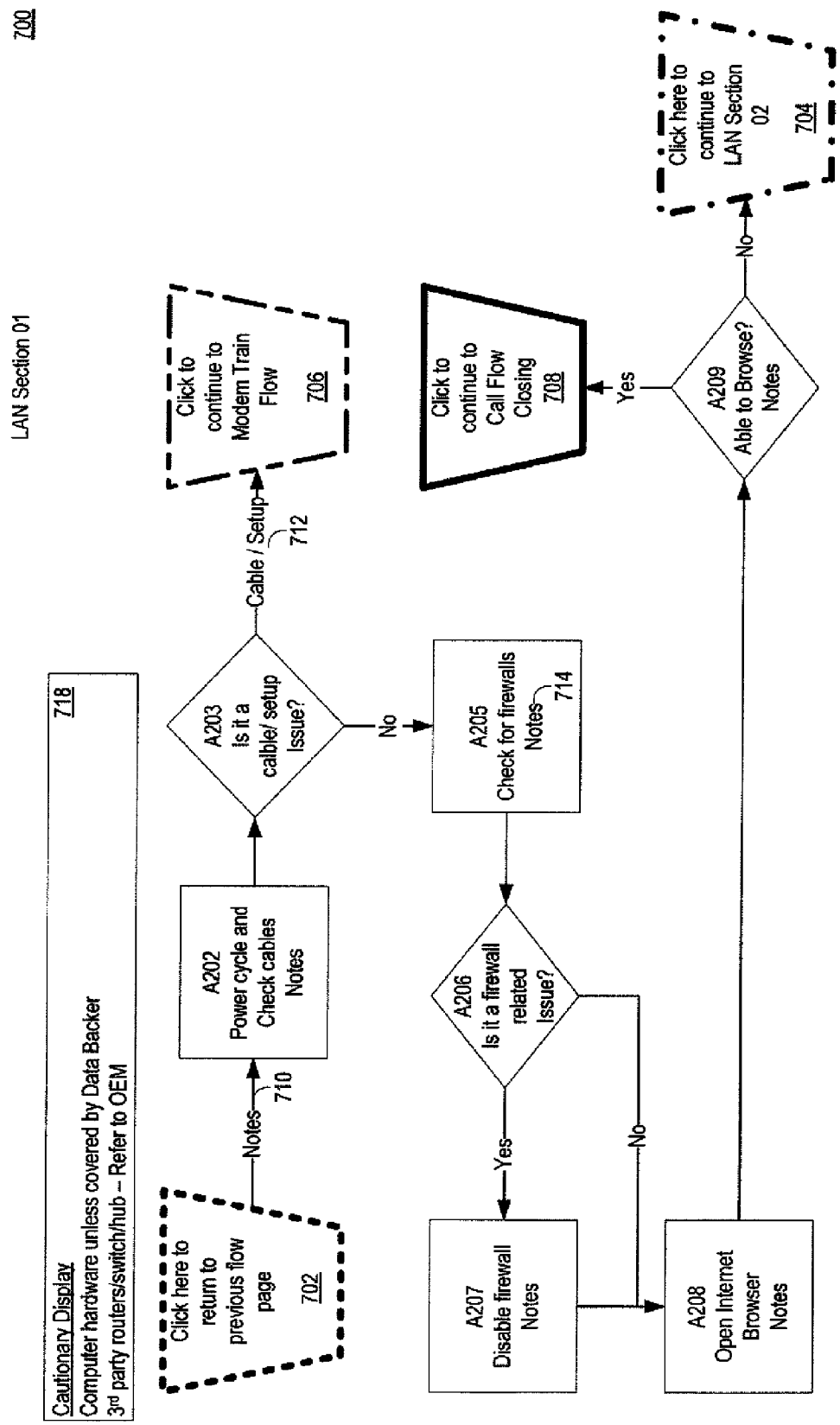
FIG. 7 shows a first display section of a Local Area Network (LAN) problem resolution call flow.

FIG. 7 shows a first display section 700 of a Local Area Network (LAN) problem resolution call flow. The CFGS 400 may transition an agent to the initial call flow node 702 of display section 700 as a result of a navigation menu item call flow selection or the selection of an internal-flow link embedded in a bridging node. In one implementation, the CFGS 400 records the navigation history between display sections and call flows. Using the navigation history, the CFGS 400 may determine whether the initial call flow node 702 represents a transition node or a bridging node, and upon agent interaction with call flow node 702, the CFGS 400 may dynamically determine whether to transition the agent to a different call flow or a different display section within a current call flow. The display section 700 includes a bridging node 704 that transitions to another display section within the current call flow. The display section 700 includes a transition node 706 that transitions to a different call flow (e.g., Modem Train Flow). The display section 700 further includes a terminal note node 708 that transitions the agent to a call flow closing in the event the agent determines that the issue is resolved. The CFGS 400 may provide connector specific notes links (e.g., 710 and 712) and note nodes 714 that upon agent interaction the CFGS renders and displays minimum mandatory information that the agent should acquire before transitioning to another node in the call flow. For the purpose of illustration, each LAN section illustrated in FIGS. 7 through 14 is represented by one display section, respectively. However, in one implementation, the CFGS may divide a LAN section into multiple display sections. FIG. 7 further illustrates a cautionary display 718 that the CFGS 400 may render and display that displays information and issues outside the scope of support for the Local Area Network (LAN) problem resolution call flow.

Figure 8:
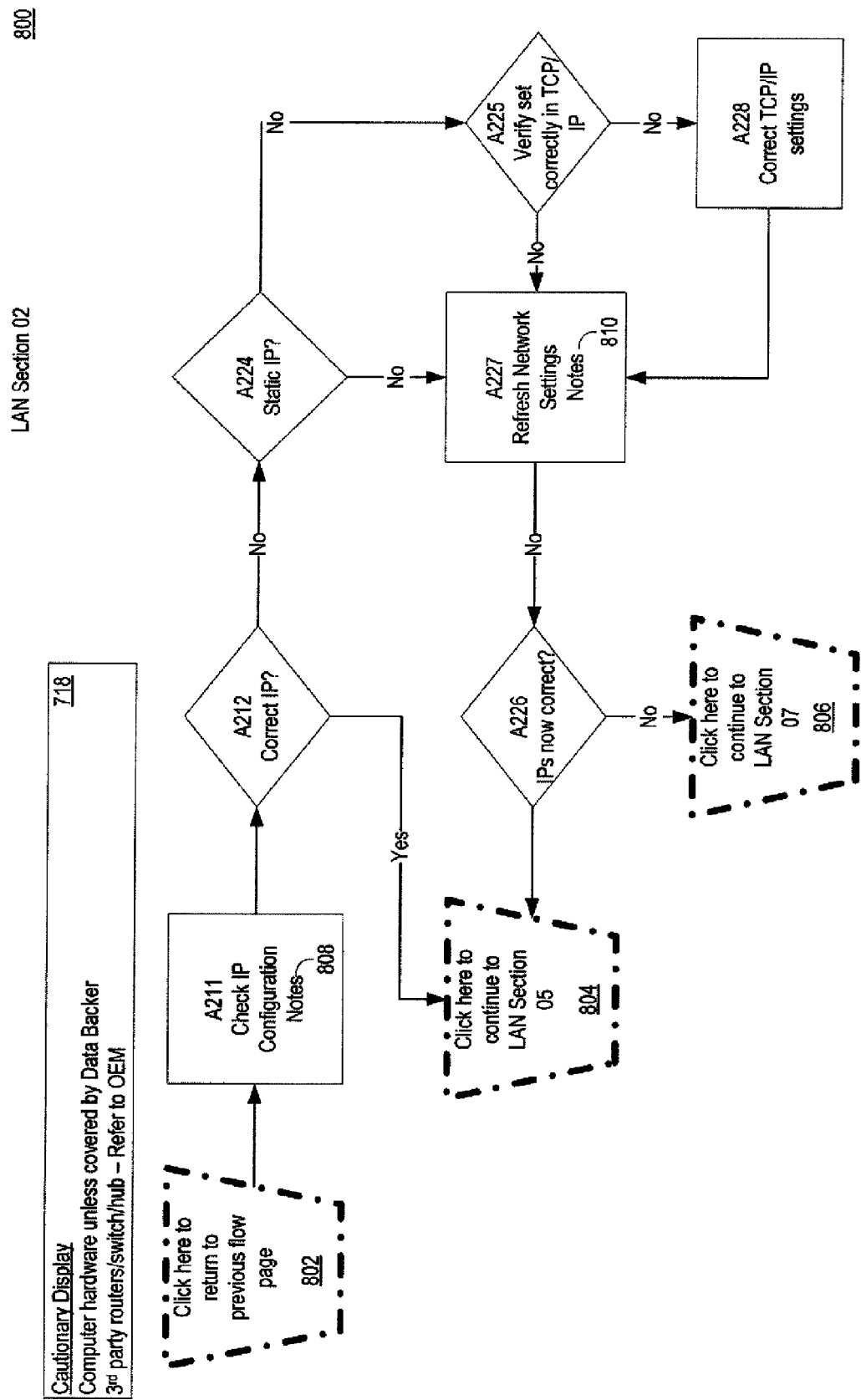
FIG. 8 shows a second display section of the LAN problem resolution call flow.

FIG. 8 shows a second display section 800 of the LAN problem resolution call flow. The second display section 800 illustrates bridging nodes (e.g., 802, 804, and 806) that the CFGS 400 renders and displays so that an agent can transition to a previous flow page (e.g., the first display section 700), and display sections corresponding to LAN section 05 and 07, respectively. FIG. 8 further illustrates note nodes (e.g., 808 and 810) that may include trouble shooting and probing questions corresponding to each note node.

Figure 9:
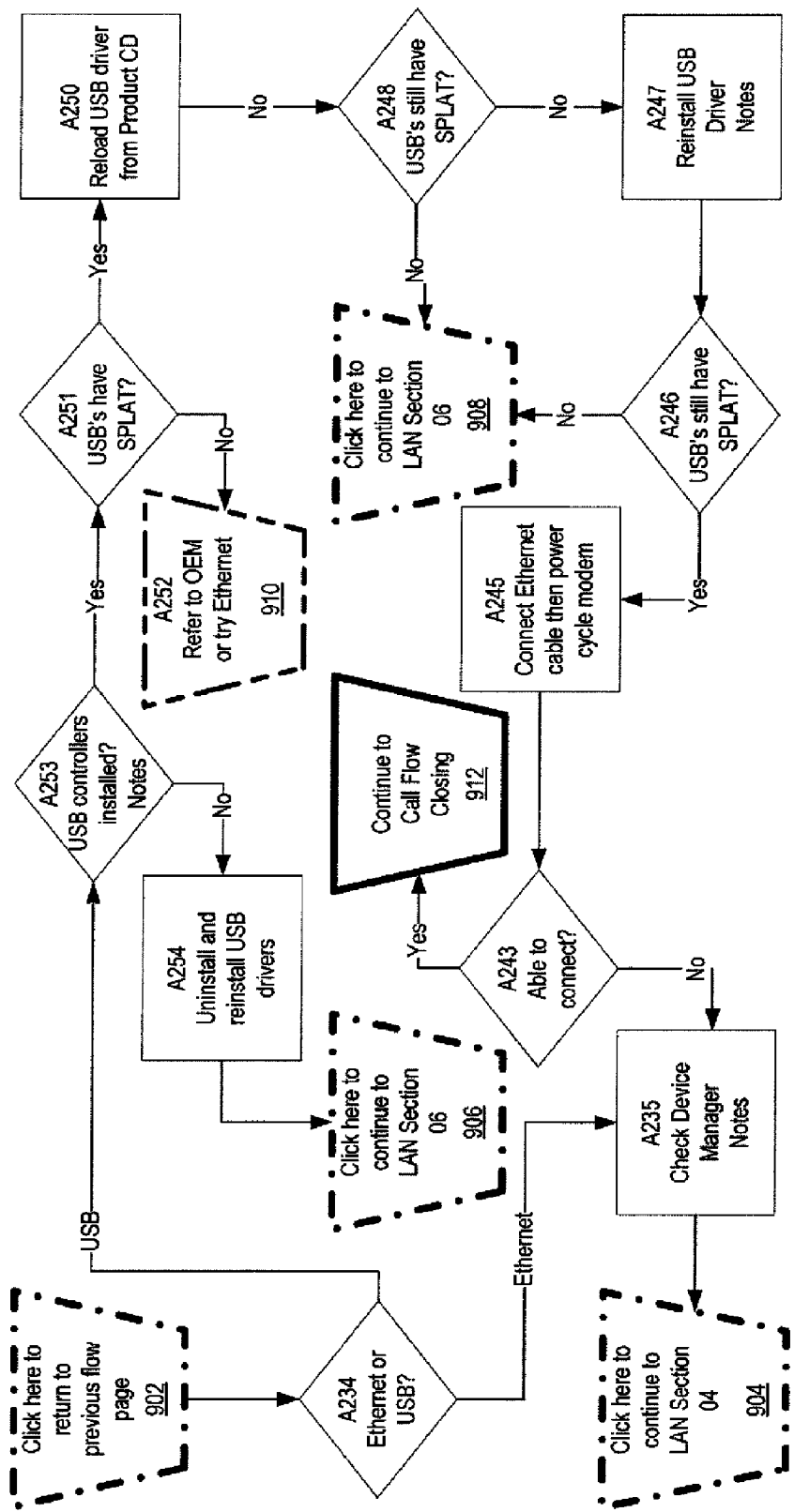
FIG. 9 shows a third display section of the LAN problem resolution call flow.

FIG. 9 shows a third display section 900 of the LAN problem resolution call flow. The third display section 900 includes bridging nodes (e.g., 902 through 908) that the CFGS 400 renders and displays so that an agent can transition to a previous flow page (e.g., second display section 800), and display sections corresponding to LAN section 04 and 06. The CFGS 400 may include, within one display section, multiple bridging nodes that transition to a given display section. For example, display section 900 includes two bridging nodes (e.g., 906 and 908) that both transition to a display section corresponding to LAN section 06. Following a series of call flow decision nodes, display section 900 navigates the agent to a transition node 910 that the CFGS 400 may use to transition the agent to a different call flow. Display section 900 further illustrates a terminal note node 912 that the CFGS 400 may use to render and display a closing script and/or transition the agent to a call flow closing display section, in the event the agent determines a resolution to the LAN problem.

Figure 10:
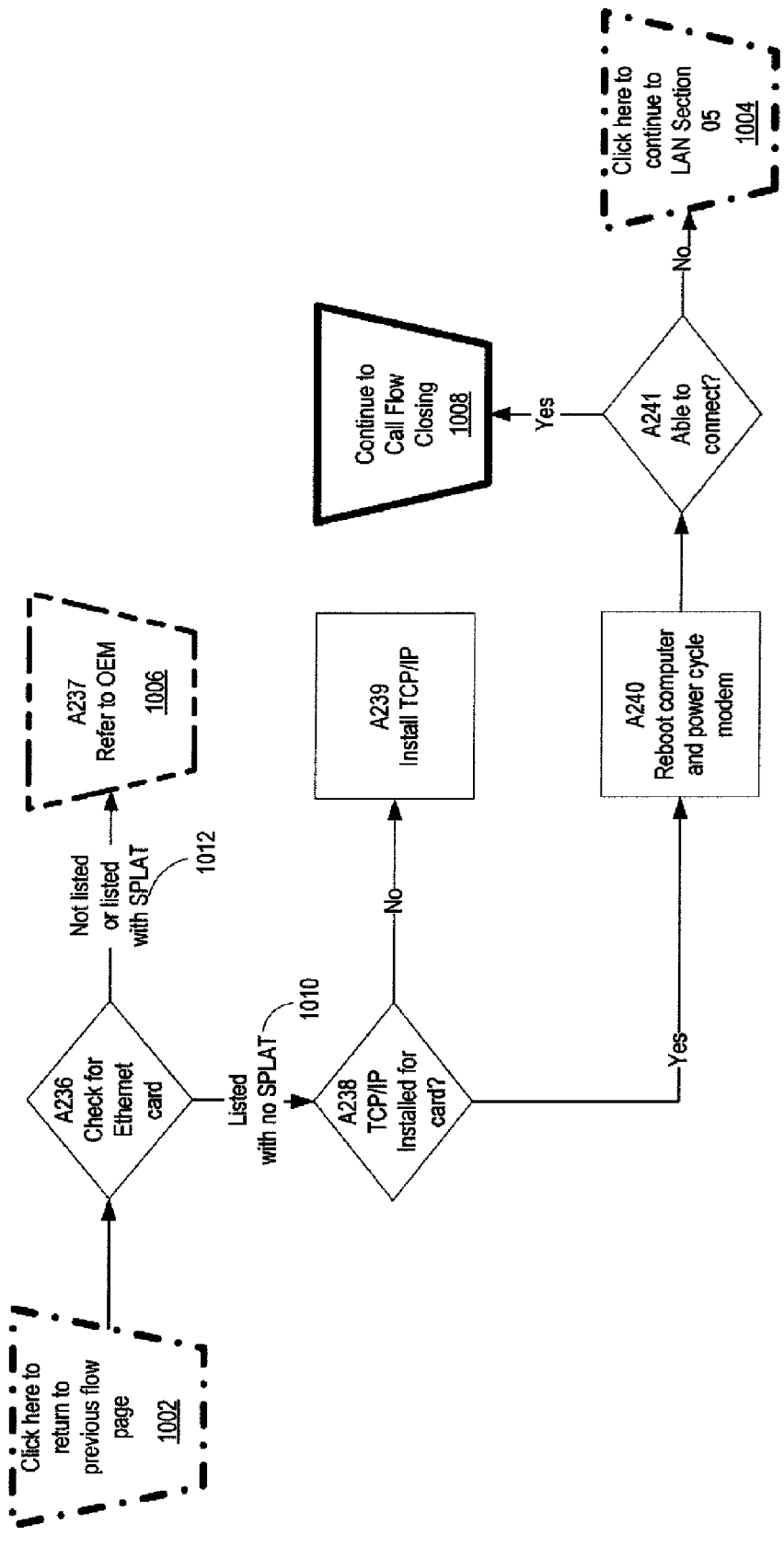
FIG. 10 shows a fourth display section of the LAN problem resolution call flow.

FIG. 10 shows a fourth display section 1000 of the LAN problem resolution call flow. The fourth display section 1000 includes bridging nodes (e.g., 1002 and 1004) that the CFGS 400 renders and displays so that an agent can transition to a previous flow page (e.g., third display section 900), and a display section corresponding to LAN section 05. The fourth display section 1000 includes a transition node 1006 that may transition the agent to a call flow specific to an original equipment manufacturer. In one implementation, the transition node 1006 provides a call flow to identify the appropriate original equipment manufacturer (OEM) and displays a closing script corresponding to contacting the OEM.

Figure 11:
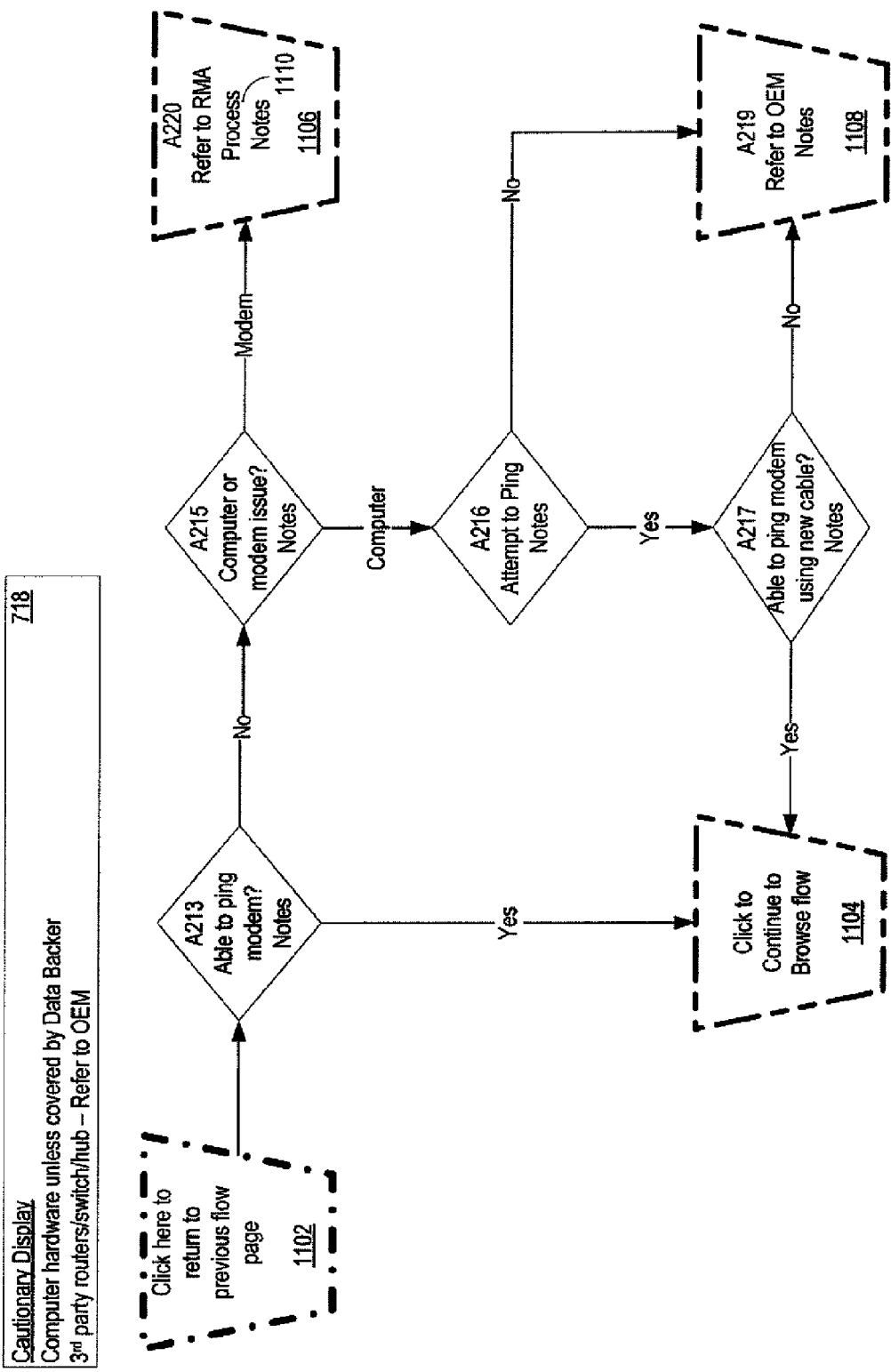
FIG. 11 shows a fifth display section of the LAN problem resolution call flow.

FIG. 11 shows a fifth display section 1100 of the LAN problem resolution call flow. The fifth display section includes a bridging node 1102 that the CFGS 400 renders and displays so that an agent can transition to a previous flow page (e.g., fourth display section 1000) corresponding to LAN section 04. The fifth display section 1110 also includes transition nodes (e.g., 1104, 1106 and 1108). Transition node 1106 includes a node note 1110 that upon agent interaction the CFGS 400 may display trouble shooting information and probing questions that the agent can use to collect and record information prior to transitioning to a different call flow. The CFGS 400 may transition the agent to a different call flow when the cross-flow link of the transition node 1106 is activated. In one implementation, the CFGS 400 activates a cross-flow link upon the selection of the border and/or area within the transition node 1106, excluding the node note 1110 so that the agent can review the corresponding node note without transitioning to a different call flow.

Figure 12:
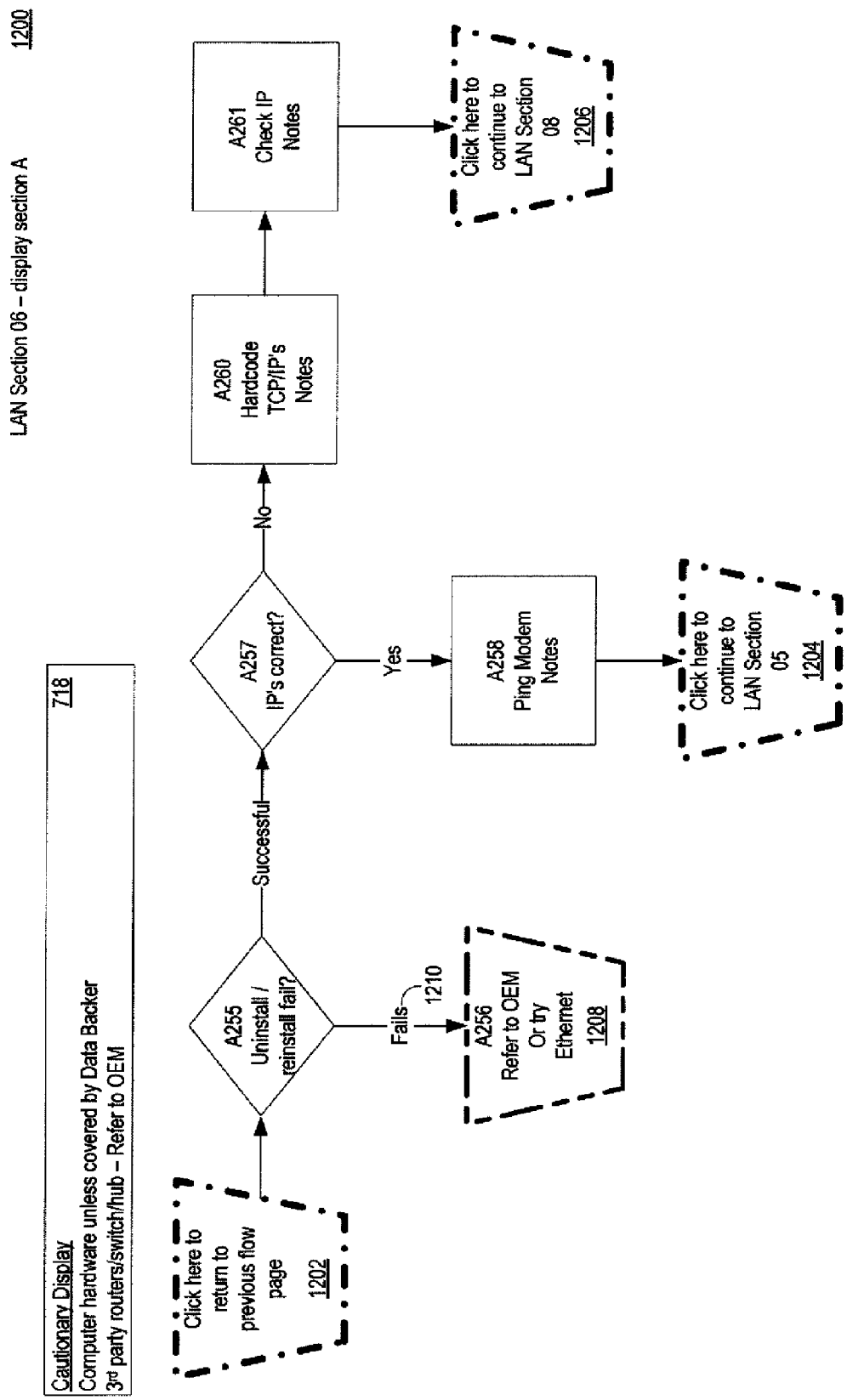
FIG. 12 shows a sixth display section of the LAN problem resolution call flow.

FIG. 12 shows a sixth display section 1200 of the LAN problem resolution call flow. The sixth display section 1200 represents the first of two display sections used by the CFGS for LAN section 06 and includes bridging nodes (e.g., 1202, 1204 and 1206) that the CFGS 400 renders and displays so that an agent can transition to a previous flow page (e.g., fifth display section 1100), and display sections corresponding to LAN section 05 and 08, respectively. The sixth display section 1200 also includes a transition node 1208 that the CFGS 400 may use to transition the agent to a different call flow. The CFGS 400 may render and display a connector specific note link 1210 that displays troubleshooting information the agent may use to determine whether to select the transition node 1208 in order to transition to a different call flow.

Figure 13:
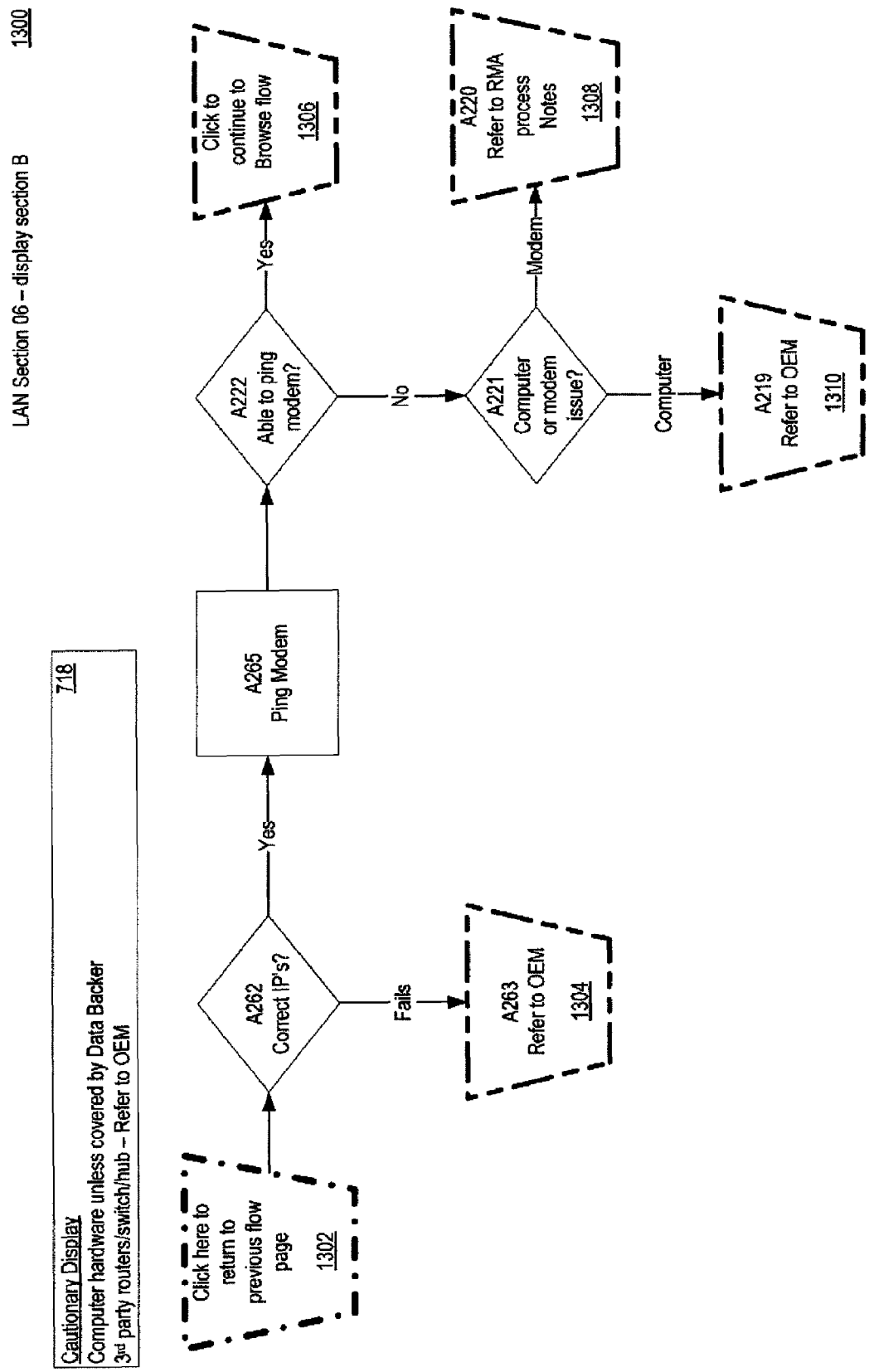
FIG. 13 shows a seventh display section of the LAN problem resolution call flow.

FIG. 13 shows a seventh display section 1300 of the LAN problem resolution call flow. The seventh display section 1300 represents the second of two display sections that the CFGS 400 may use to render and display the process steps for LAN section 06. The seventh display section 1300 includes bridging node 1302 that the CFGS 400 renders and displays so that an agent can transition to a previous flow page (e.g., sixth display section 1200). The seventh display section 1300 also includes transition nodes (e.g., 1304, 1306, 1308 and 1310) that the CFGS 400 uses to transition the agent to different call flows.

Figure 14:
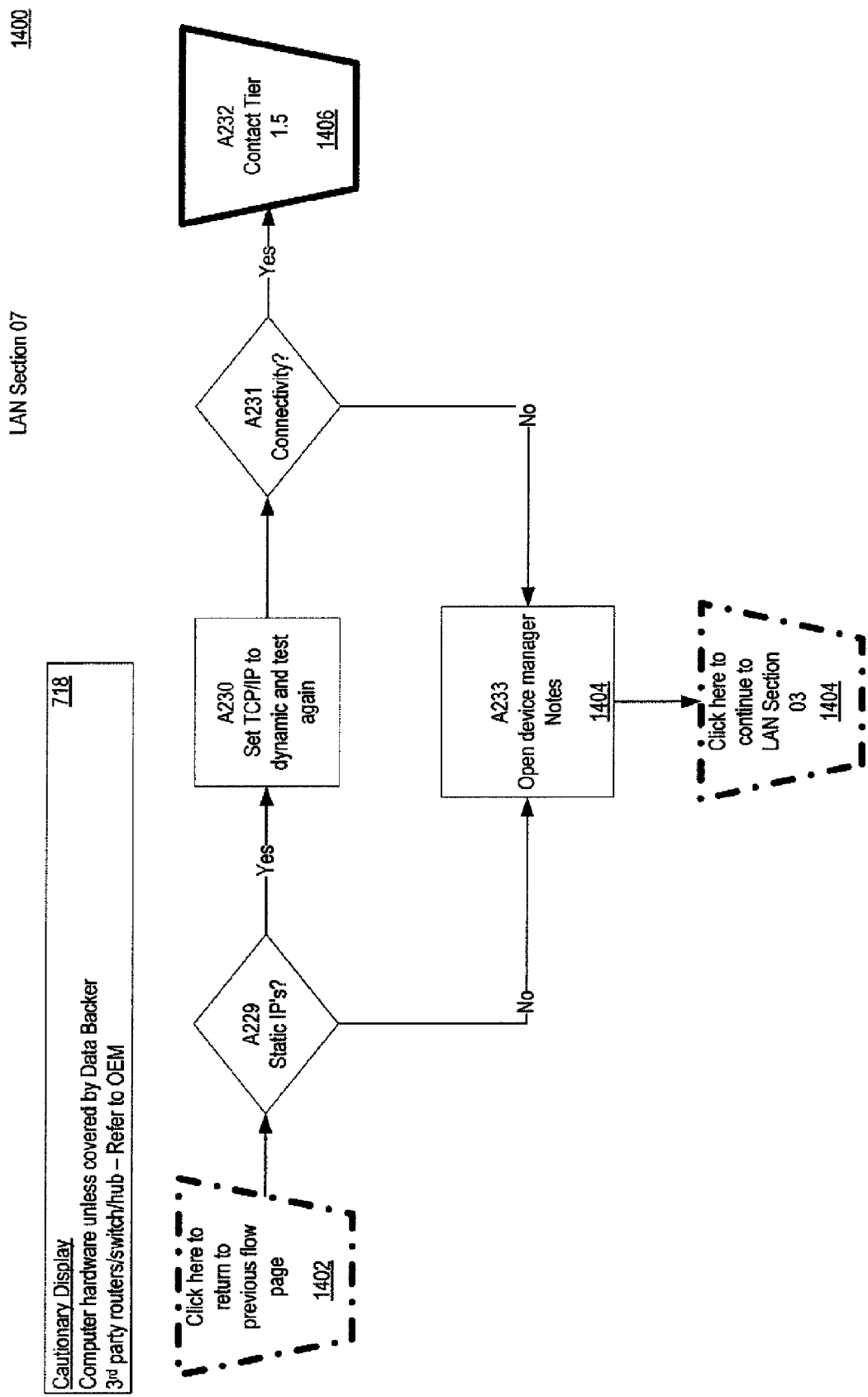
FIG. 14 shows an eighth display section of the LAN problem resolution call flow.

FIG. 14 shows an eighth display section 1400 of the LAN problem resolution call flow. The eighth display section 1400 includes bridging nodes (e.g., 1402 and 1404) that the CFGS 400 renders and displays so that an agent can transition to a previous flow page (e.g., seventh display section 1300) and a display section corresponding to LAN section 03, respectively. The eighth display section 1400 also includes a terminal note node 1406 that the CFGS 400 may render and display to indicate to the agent when the agent has transitioned to the end of a call flow.

Although selected aspects, features, or components of the implementations are depicted as stored in computer-readable memories (e.g., as computer-executable instructions), all or part of the systems and structures may be stored on, distributed across, or read from other computer-readable media. The computer-readable media may include, for example: secondary storage devices such as hard disks, floppy disks, and CD-ROMs; a signal, such as a signal received from a network or received at an antenna; or other forms of memory, including ROM or RAM, either currently known or later developed.

Various implementations of the CFGS 400 may include additional or different components. A processor 404 may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory 402 or database, may be logically and physically organized in many different ways, and may implemented in many ways, including data structures such as linked lists, hash tables, or implicit storage mechanisms. Programs may be combined or split among multiple programs, or distributed across several memories and processors.

The CFGS 400 provides unexpectedly good results for a call flow tool. In particular, the CFGS 400 support for multiple call flow branching, wide variety of link types, dynamic content, and the capability to monitor and measure the effectiveness of the tool provide unexpectedly good results. The unexpectedly good results include significantly improved AHT, FCR, efficient navigation through complex call flows, and improved adoption rates and training timelines for agents.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed:

1. A call flow guidance system comprising:
   a memory comprising:
      a call flow definition of multiple nodes in a first call flow, the call flow definition comprising:
         a first display section of the call flow comprising a first set of the multiple nodes for joint display and interaction;
         a second display section of the call flow comprising a second set of the multiple nodes for joint display and interaction;
         a node specific note link in a note node among the multiple nodes, the node specific note link operable to display troubleshooting information specific to the note node;
         an internal-flow link in a bridging node among the multiple nodes, the internal-flow link operable to transition from the first display section to the second display section; and
         a cross-flow link in a transition node among the multiple nodes, the cross-flow link operable to transition display from the first call flow to a different call flow; and
      a call flow guidance program operable to facilitate interaction with the node specific note link, the internal-flow link, and the cross-flow link; and
   a processor coupled to the memory and operable to execute the call flow guidance program.

2. The call flow guidance system of claim 1, where the memory further comprises:
   a flagged subject matter definition specific to the call flow; and where the call flow guidance program is further operable to render a cautionary display based on the flagged subject matter definition outside the first display section.

3. The call flow guidance system of claim 1, where:
   the first display section and the second display section fit within a screen bound that eliminates scrolling to reach any of the first set or second set of multiple nodes when the first display section and second display section are rendered for display.

4. The call flow guidance system of claim 1, where the call flow definition further comprises:
   a specific note link emphasis definition for the note node;
   an internal-flow link emphasis definition for the bridging node; and
   a cross-flow link emphasis definition for the transition node.

5. The call flow guidance system of claim 4, where:
   at least one of the specific note link emphasis definition for the note node, the internal-flow link emphasis definition for the bridging node, and the cross-flow link emphasis definition for the transition node comprises a color definition.

6. The call flow guidance system of claim 1, where:
   the troubleshooting information specific to the note node comprises probing questions specific to resolving customer problems through the first call flow.

7. The call flow guidance system of claim 1, where the memory further comprises:
   a navigation menu comprising call flow selections; and
   where the call flow guidance program is operable to receive a navigation menu selection and render the first display section in response to the navigation menu selection.

8. A call flow guidance method comprising:
   defining, in a memory coupled to a processor, a call flow of multiple nodes comprising:
      a first display section, displayed in a display interface by the processor in communication with the display interface, comprising a first set of the multiple nodes for joint display and interaction;
      a second display section, displayed in the display interface by the processor, comprising a second set of the multiple nodes for joint display and interaction;
      a node specific note link in a note node among the multiple nodes, the node specific note link that when executed by the processor causes the processor to display in the display interface troubleshooting information specific to the note node;
      an internal-flow link in a bridging node among the multiple nodes, the internal-flow link that when executed by the processor causes the processor to transition from the first display section to the second display section; and
      a cross-flow link in a transition node among the multiple nodes, the cross-flow link that when executed by the processor causes the processor to transition display from the first call flow to a different call flow; and
   initiating execution of a call flow guidance program that when executed by the processor causes the processor to facilitate interaction with the node specific note link, the internal-flow link, and the cross-flow link.

9. The method of claim 8, further comprising:
   defining, in the memory, a flagged subject matter specific to the call flow; and
   rendering, in the display interface by the processor, a cautionary display based on the flagged subject matter definition outside the first display section.

10. The method of claim 8, further comprising:
    rendering, in the display interface by the processor, the first display section and the second display section to fit within a screen bound that eliminates scrolling to reach any of the first set or second set of multiple nodes when the first display section and second display section are rendered for display.

11. The method of claim 8, further comprising defining, in the memory:
    a specific note link emphasis for the note node;
    an internal-flow link emphasis for the bridging node; and
    a cross-flow link emphasis for the transition node.

12. The method of claim 11, further comprising:
    defining, in the memory, color for at least one of the specific note link emphasis for the note node, the internal-flow link emphasis for the bridging node, and the cross-flow link emphasis for the transition node comprises a color definition.

13. The method of claim 8, further comprising:
    displaying, in the display interface by the processor, probing questions specific to resolving customer problems through the first call flow in the troubleshooting information specific to the note node.

14. The method of claim 8, further comprising:
    displaying, in the display interface by the processor, a navigation menu comprising call flow selections;
    receiving, in the memory by the processor, a navigation menu selection; and
    rendering the first display section, in the display interface by the processor, in response to the navigation menu selection.

15. A product comprising:
    a computer-readable memory; and
    a call flow definition stored in the computer-readable memory and executable by a processor that when executed by the processor causes the processor to establish in a display interface:
       multiple nodes in a first call flow;
       a first display section of the call flow comprising a first set of the multiple nodes for joint display and interaction;
       a second display section of the call flow comprising a second set of the multiple nodes for joint display and interaction;
       a node specific note link in a note node among the multiple nodes, the node specific note link that when executed by the processor causes the processor to display troubleshooting information specific to the note node;
       an internal-flow link in a bridging node among the multiple nodes, the internal-flow link that when executed by the processor causes the processor to transition from the first display section to the second display section; and
       a cross-flow link in a transition node among the multiple nodes, the cross-flow link that when executed by the processor causes the processor to transition display from the first call flow to a different call flow; and
    a call flow guidance program stored on the computer-readable memory, that when executed by the processor causes the processor to facilitate interaction with the node specific note link, the internal-flow link, and the cross-flow link.

16. The product of claim 15, where the call flow definition that when executed by the processor further causes the processor to establish:
    a flagged subject matter specific to the call flow; and
    the call flow guidance program that when executed by the processor further to render a cautionary display based on the flagged subject matter definition outside the first display section.

17. The product of claim 15, where the call flow guidance program that when executed by the processor further causes the processor to:
    render the first display section and the second display section, in the display interface, to fit within a screen bound that eliminates scrolling to reach any of the first set or second set of multiple nodes when the first display section and second display section are rendered for display.

18. The product of claim 15, where the call flow definition that when executed by the processor further causes the processor to establish:
    a specific note link emphasis for the note node;
    an internal-flow link emphasis for the bridging node; and
    a cross-flow link emphasis for the transition node.

19. The product of claim 15, where the call flow definition that when executed by the processor further causes the processor to establish:

a probing question specific to resolving customer problems through the first call flow in the troubleshooting information specific to the note node.

20. The product of claim 15, where the call flow guidance program that when executed by the processor is further causes the processor to:

display a navigation menu, in the display interface, comprising call flow selections and receive a navigation menu selection; and render the first display section, in the display interface, in response to the navigation menu selection.

\* \* \* \* \*

UNITED STATES PATENT AND TRADEMARK OFFICE
CERTIFICATE OF CORRECTION

| | | |
|---|---|---|
| PATENT NO. | : 8,031,858 B2 | Page 1 of 1 |
| APPLICATION NO. | : 11/950160 | |
| DATED | : October 4, 2011 | |
| INVENTOR(S) | : Michael J. Miller et al. | |

It is certified that error appears in the above-identified patent and that said Letters Patent is hereby corrected as shown below:

In the Drawings

In Figure 7, in triangle A203, replace "calble/ setup" with --cable/ setup--.

In column 2, line 56, after "links to pertinent" delete "the".

In column 5, lines 18-19, after "may not have the" replace "experienced" with --experience--.

In column 5, line 36, after "identifies subject matter" replace "consider" with --considered--.

In column 6, line 11, after "will be described in" replace "detail further" with --further detail--.

In column 6, line 47, immediately after "1920×1080" insert --,--.

In column 9, line 27, after "one of a number" insert --of--.

In column 13, line 58, after "connector specific" replace "notes" with --note--.

In column 19, claim 20, line 8, after "executed by the processor" delete "is".

Signed and Sealed this
Third Day of January, 2012

David J. Kappos
*Director of the United States Patent and Trademark Office*